United States Patent [19]

Tomiyama et al.

[11] 4,319,698

[45] Mar. 16, 1982

[54] AUTOMATIC CUP DRINK VENDING MACHINE

[75] Inventors: Muneo Tomiyama, Nara; Keiichi Mizugane, Yao; Kazunori Taniguchi, Osaka; Toshio Nonaka, Izumisano; Hidenori Oodoi, Suita, all of Japan

[73] Assignee: Kubota Ltd., Osaka, Japan

[21] Appl. No.: 107,047

[22] Filed: Dec. 26, 1979

[30] Foreign Application Priority Data

Aug. 30, 1979 [JP] Japan .............................. 54-112698
Aug. 31, 1979 [JP] Japan .......................... 54-120848[U]

[51] Int. Cl.³ .............................................. B67D 5/62
[52] U.S. Cl. ............................. 222/129.1; 222/146 C; 62/398; 62/400
[58] Field of Search ............ 222/146 C, 146 R, 129.1, 222/129.2, 129.3, 129.4; 62/398, 400, 344

[56] References Cited

U.S. PATENT DOCUMENTS

3,021,035 2/1962 Hill .................................. 222/146 C
3,059,450 10/1962 Mueller et al. ............. 222/146 C X
3,196,625 7/1965 Nicolaus ...................... 222/146 C X
3,827,256 8/1974 Wiesner ...................... 222/146 C X

*Primary Examiner*—Allen N. Knowles
*Attorney, Agent, or Firm*—W. G. Fasse; D. F. Gould

[57] ABSTRACT

For the purpose of automatically vending cups of cold drinks, ice being directly put into a cup, source powder or a concentrated source liquid, and cold water are required for mixture. Ice is made by an ice making machine. Cold water is prepared by cooling city water with ice made by the ice making machine. To that end, a cylinder for stocking ice formed of apertures at a portion of the peripheral wall thereof for allowing a flow of the water therethrough and a cold water tank for storing cold water around the cylinder are provided. Ice made by the ice making machine is selectively supplied into a cup for vending or into the ice storing cylinder for the cold water. The cold water is held in the cold water tank and is withdrawn through the ice storing cylinder while the same is in contact with the ice stored therein. The cold water is mixed with the source powder or the concentrated source liquid and the mixture is guided to a cup together with the ice.

29 Claims, 10 Drawing Figures

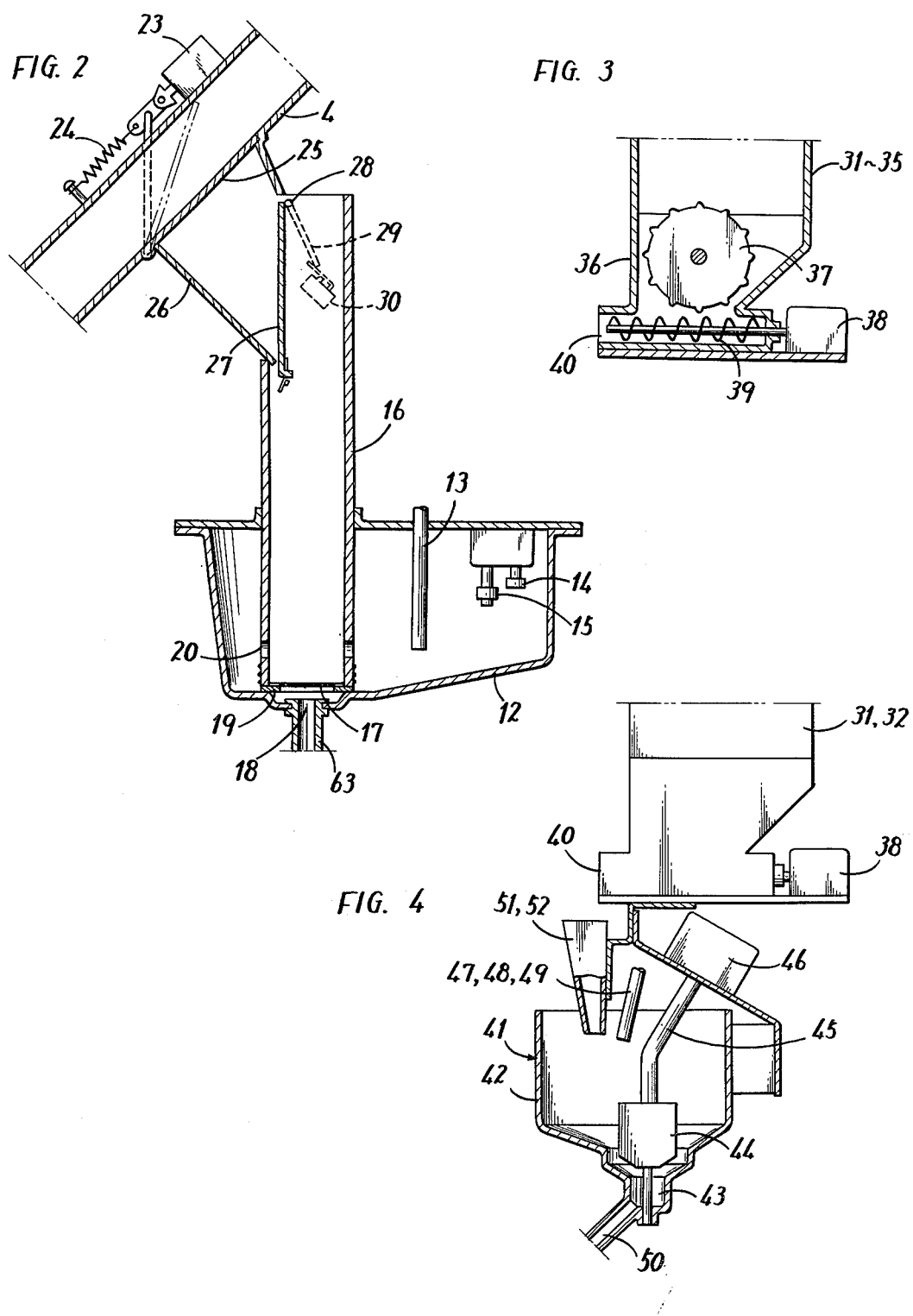

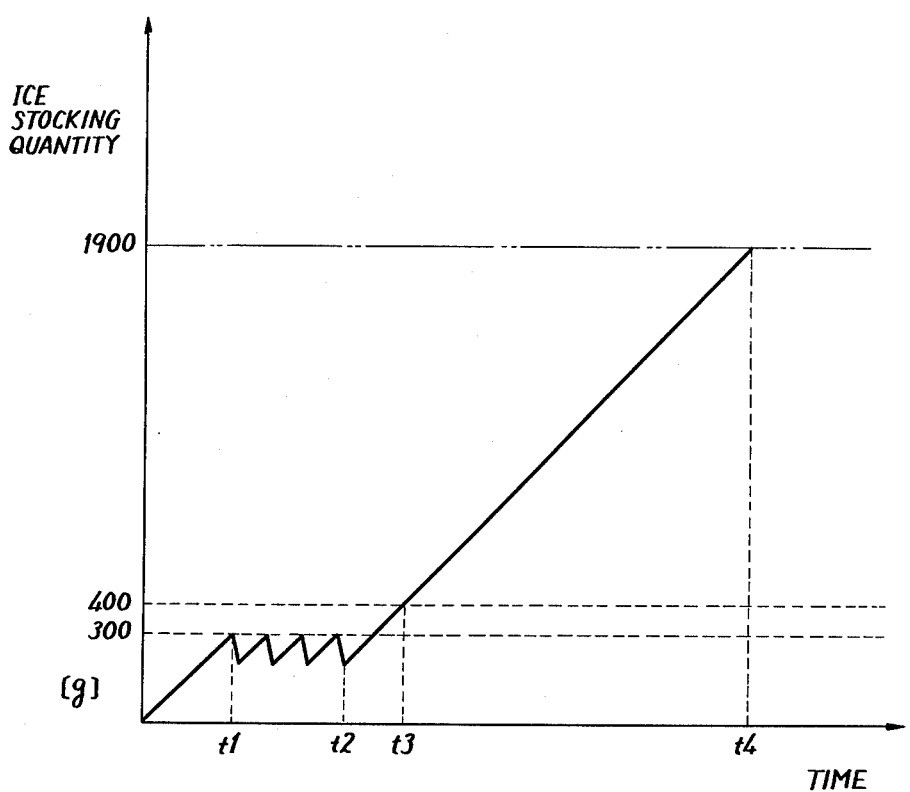

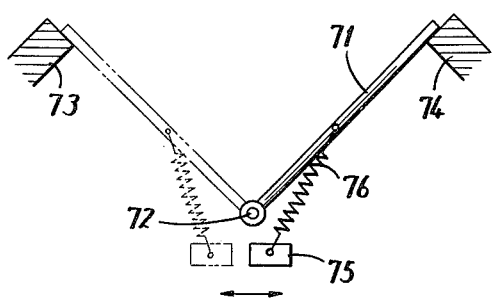
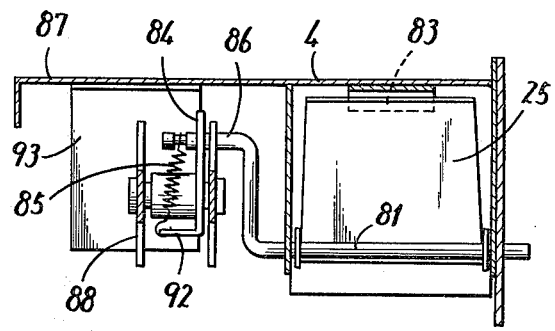
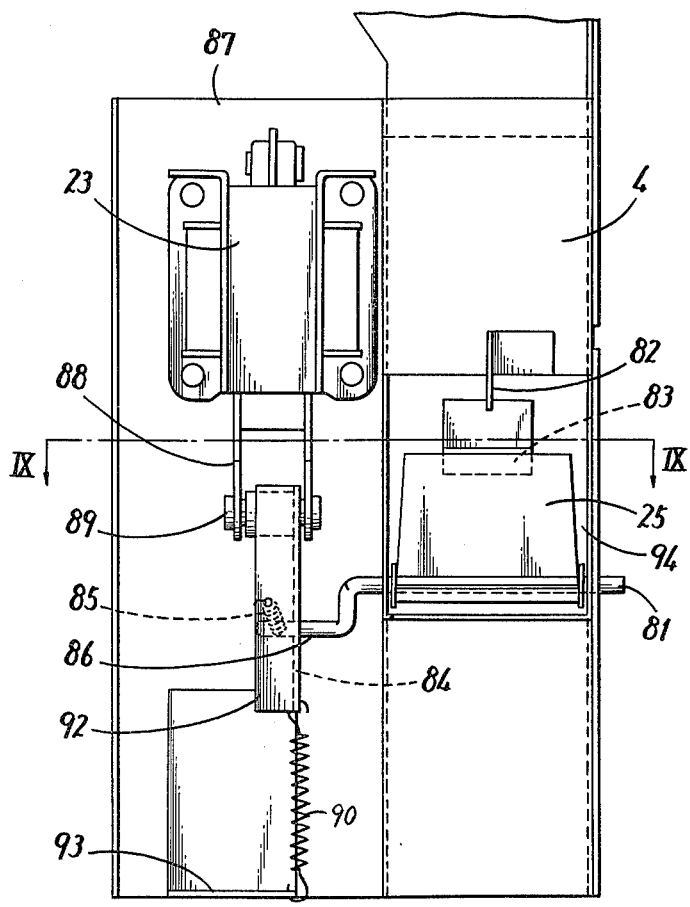
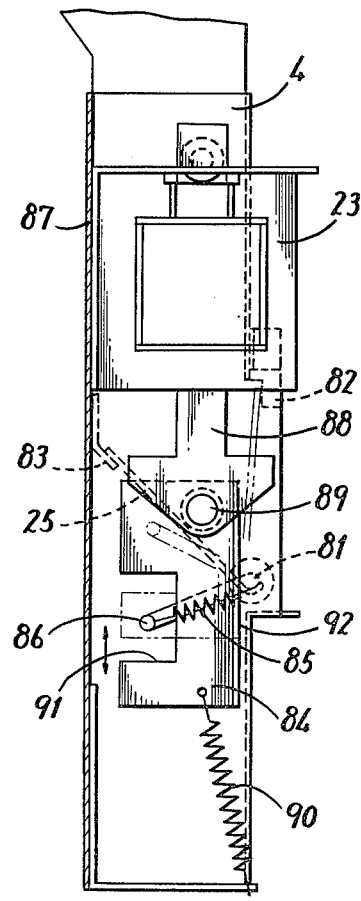

AUTOMATIC CUP DRINK VENDING MACHINE

BACKGROUND OF THE INVENTION

1. Field of the Invention

The present invention relates to an automatic cup drink vending machine. More specifically, the present invention relates to an automatic cup drink vending machine capable of vending cold drinks in a postmix fashion.

2. Description of the Prior Art

An automatic cup drink vending machine can vend cold drinks or hot drinks. The known automatic cup drink vending machines for vending cold drinks may be classified into two types, i.e. a postmix type and a premix type. Vending machines of a postmix type are adapted such that at each cup vending a source material such as a concentrated source liquid or source powder is mixed with water or cold water in the automatic vending machine, whereupon the mixture is poured into a cup. In some vending machines of the postmix type, ice is further put into a cup being vended, so that colder drinks can be vended. On the other hand, vending machines of the premix type are adapted such that drinks as mixed in advance are stored and are guided into a cup while the drinks are cooled. The present invention is directed to an improvement in an automatic cup drink vending machine for vending cold drinks in a postmix fashion.

Known cup cold drink automatic vending machines of the postmix type may be divided into four groups. Vending machines of the first group are structured such that a cup for vending is brought to a vending position, ice say 70 g is in advance put into the cup, and a hot concentrated source liquid obtained by mixing hot water of say 70 cc heated to say 90° C. with source powder is poured into the cup with the ice of 70 g contained therein. Accordingly, the hot water in which the source powder is dissolved is cooled by the ice in the cup, so that a cold drink of approximately 140 cc can be vended. The vending machines of the second group are structured such that similarly ice of approximately 50 g is put into a cup for vending, source powder is dissolved into hot water of say 90 cc heated to say 90° C., the solution or a concentrated source liquid is cooled by a cooler and then the cooled mixture is poured into the cup as a cold drink. The vending machines of the third group are structured such that similarly ice of approximately 40 g is stored in advance, source powder is dissolved into hot water of approximately 30 cc heated to approximately 90° C. and then cold water of approximately 70 cc is poured into the hot mixture, whereby a cold drink of approximately 100 cc cooled to approximately 15° C. is obtained as a mixture, which is then poured into the cup. The vending machines of the fourth group are structured such that similarly ice of say 40 g is stored in a cup for vending, a concentrated source liquid as cooled by a cooler and cold water as similarly cooled by the cooler are both introduced into the cup, whereby the concentrated source liquid and the cold water are mixed in the cup.

Prior art vending machines of the postmix type have the following disadvantages. More specifically, according to the above described first vending machine group, since a hot drink is poured into a cup in which ice has been put in advance, whereby the hot drink is converted into a cold drink in the cup by virtue of the ice, it is difficult to attain a uniform temperature distribution of the cold drink in the cup, with the result that a temperature distribution is caused such that a lower portion is relatively warm while the upper portion is relatively cold by virtue of the ice. Furthermore, since relatively more ice is put in advance into the cup, the number of cups that can be consecutively vended is limited by the capacity of an ice storing portion for storing the ice within the machine. Nevertheless, an attempt to eliminate such problem requires that a larger quantity of ice be stored, which requires a large size ice storing means and thus increases the size of the whole apparatus. On the other hand, with the above described second group of the vending machines, the temperature of the drinks being vended cannot be sufficiently lowered, unless a relatively powerful cooler is employed. Furthermore, in case of any of the above described second, third and fourth groups of vending machines, it is required to employ two refrigerating cycles, i.e. a first refrigerating cycle for making ice and a second refrigerating cycle for cooling water or making cold water. Accordingly, the machines become complicated and the cost becomes expensive. Furthermore, generally the refrigerating cycle for making cold water is not energy sufficient, which is undesirable from an energy conservation point of view.

SUMMARY OF THE INVENTION

According to the present invention, an automatic cup drink vending machine is provided, wherein a refrigerating cycle for making ice and a refrigerating cycle for making cold water are implemented by a common refrigerating cycle, thereby to eliminate the above described problems. More specifically, the ice made by an ice making machine is directly brought to a cup and at the same time is stored at a portion for cooling, such that the stored ice acts on city water, for example, thereby to make cold water. Since the ice made by the ice making machine is effectively used both for the purpose of putting the same into a cup for vending and for the purpose of making cold water, only one refrigerating cycle is required, and accordingly the structure thereof is simplified and the entire apparatus becomes less expensive. Furthermore, since water is cooled by the use of the heat of fusion of the ice, the cooling efficiency is high and accordingly the required energy can be reduced.

In a preferred embodiment of the present invention, source powder is dissolved in advance into a small quantity of hot water and stirred before the same is mixed with cold water. Accordingly, the source powder is fully and uniformly dissolved into the hot water. As a result, even in case where cold coffee is to be vended by using coffee powder which is less readily dissoluble as a source material, for example, such non-uniformity of the source material does not occur and hence ice coffee of high quality can be vended.

In a further preferred embodiment of the present invention, the machine is adapted such that at the beginning of operation of the machine the ice for making cold water is preferentially stored, whereupon ice for the vending operation is made. Thereafter the ice is preferentially utilized for the vending purpose. Accordingly, the number of cups that can be consecutively vended can be increased, by using one refrigerating cycle and without increasing the ice storing capacity.

Accordingly, a principal object of the present invention is to provide an improved automatic cold cup drink vending machine of the postmix type.

Another object of the present invention is to provide an automatic cup drink vending machine for vending cold drinks, with an improved energy efficiency, thereby to effectively reduce the consumption of energy.

A further object of the present invention is to provide an automatic cup drink vending machine that is capable of vending cold drinks of a high quality.

Still a further object of the present invention is to provide an automatic cup drink vending machine, that employs only one refrigerating cycle and increases the number of cups that can be consecutively vended.

These objects and other objects, features, aspects and advantages of the present invention will become more apparent from the following detailed description when taken in conjunction with the accompanying drawings.

BRIEF DESCRIPTION OF THE DRAWINGS

FIG. 2 is a sectional view showing in an enlarged manner a cold water tank and a portion associated therewith;

FIG. 3 is a sectional view showing a structure of one example of a source material dispensing machine;

FIG. 4 is a sectional view showing a mixing portion for mixing a hot water admixed with a source material and cold water;

FIG. 5A is a graph depicting the operation of the FIG. 5 control circuit for controlling the ice making machine, wherein the ordinate indicates an ice storing quantity and the abscissa indicates the time;

FIG. 6 is a diagrammatic view showing a fundamental structure of an ice switching gate;

FIG. 7 is a front view of another example of an ice dispensing chute using a gate as shown in FIG. 6;

FIG. 8 is a side view of the FIG. 7 diagram; and

FIG. 9 is a transversal sectional view taken along the line VIII—VIII in FIG. 7.

DESCRIPTION OF THE PREFERRED EMBODIMENTS

Figure 1:
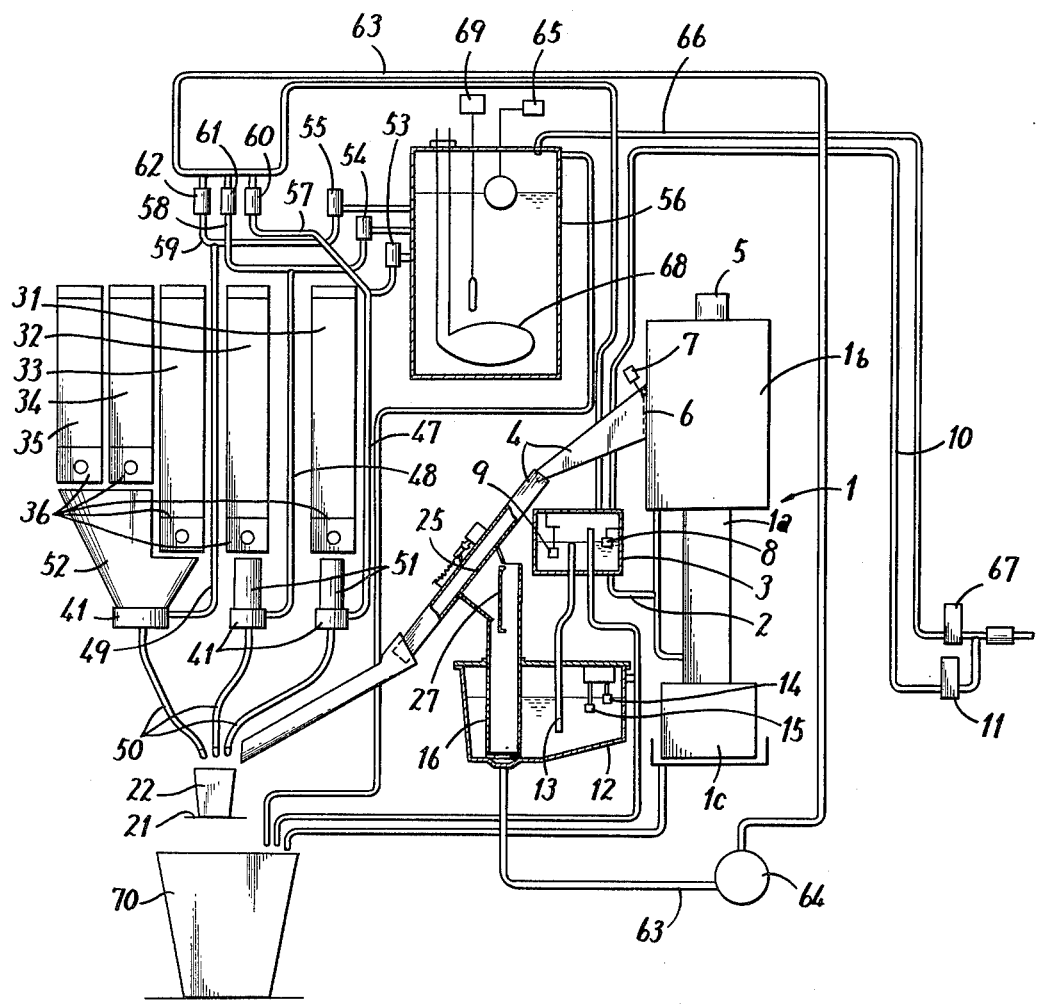
FIG. 1 is a diagrammatic view showing a structure of one embodiment of the inventive automatic cup drink vending machine according to the invention.

FIG. 1 is a diagrammatic view showing one embodiment of the present invention, comprising an automatic cup drink vending machine of the postmix type which is capable of selectively vending a hot drink and a cold drink. As hot drinks, coffee, tea, cocoa and the like can be vended. On the other hand, as cold drinks, juice and the like as well as the above described coffee, tea, cocoa and the like can be vended. In the case of coffee, for example, an instant type (instant coffee powder is admixed with sugar, cream and the like and is dissolved into hot water to be ready for vending), and another type (hot water is put on ground coffee to be ready for vending) can both be employed. However, for simplicity, the embodiment will be described as employing the above described instant type, wherein the source powder is dissolved into hot water to provide a hot drink.

Referring to FIG. 1, ice for use in a vending operation and for use in making cold water is made by an ice making machine 1. Although such ice making machine 1 is well known to those skilled in the art, the operation thereof will be briefly described. The ice making machine 1 comprises a cylindrical portion 1a for maintaining a constant water level which is the same as that of a sustain tank 3 due to a connecting pipe 2, and an ice storing portion 1b provided above the cylindrical portion 1a and coupled to the cylindrical portion 1a. A portion 1c for housing a compressor (not shown), a geared motor (not shown) and the like is located beneath the cylindrical portion 1a. A screw (not shown) is provided within the cylindrical portion 1a so as to be driven by the above described geared motor. The ice making machine 1 operates such that the water supplied from the sustain tank 3 is cooled by the compressor, while the screw is rotated by the geared motor to push upward pieces of ice to the ice storing portion 1b. The ice storing portion 1b of the ice making machine 1 is coupled to an ice dispensing chute 4, so that the ice pieces may be dispensed through the chute 4. The ice storing portion 1b of the ice making machine 1 is also provided with a full state detecting switch 5 for detecting that the ice pieces in the ice stocking portion 1b reach a predetermined quantity or reach a full state. An ice dispensing gate 6 is provided between the ice stocking portion 1b and the dispensing chute 4 fo opening/or closing an ice dispensing port. The ice dispensing gate 6 is adapted to be opened or closed by means of a gate driving apparatus 7 including a solenoid, for example.

A cold water tank 12 is located below the sustain tank 3. A drain pipe 13 operatively connects an upper portion of the sustain tank 3 with a lower portion of the cold water tank 12, so that water is supplied to the cold water tank 12 only if and when the water level in the tank 3 reaches a predetermined level. The sustain tank 3 is provided with a high level switch 8 and a low level switch 9 for detecting the water levels in the tank 3. Similarly, the cold water tank 12 is also provided with a high level switch 14 and a low level switch 15. The sustain tank 3 is supplied with tap water, for example, by controlling a magnetic valve 11 provided in a water supply pipe 10. A pump 64 and the magnetic valve 11 are controlled by the above described switches 8, 9, 14 and 15, so that the level in the sustain tank 3 and thus the level of the cylindrical portion 1a of the ice making machine 1 is maintained within a prescribed range.

An ice storing cylinder 16 is provided within the cold water tank 12. The ice storing cylinder 16 is open at the lower end thereof, as shown in FIG. 2, with the opened end covered with a net 17 see FIG. 2. The ice storing cylinder 16 is so located that the lower end thereof communicates with a cold water outlet 18 at the bottom of the cold water tank 12. A seal 19 is inserted between the net 17 and the outer periphery of the cold water outlet 18, so that the water in the cold water tank 12 may not directly flow to the cold water outlet 18. A plurality of communicating apertures are formed in a lower portion of the sidewall of the ice storing cylinder 16. Accordingly, the water in the ice water tank 12 necessarily flows through the ice storing cylinder 16 to the cold water outlet 18. While the water flows through the ice storing cylinder 16, the ice (not shown) stored therein acts on the water, so that the water is directly cooled. Accordingly, the water is cooled with an excellent cooling efficiency, thereby to effectively minimize the energy consumed by the machine.

The ice dispensing chute 4 dispenses ice pieces from the ice storing portion 1b of the ice making machine 1 into a cup 22 placed on a cup table 21 of the vending machine, as shown in FIG. 1. The ice cylinder 16 is located below the middle of the ice dispensing chute 4. A branch chute 26 communicates with the upper end side of the ice storing cylinder 16. The branch chute 26 is aimed to guide the ice pieces from the ice dispensing chute 4 into the ice storing cylinder 16. The branch chute 26 communicates with the ice dispensing chute 4 and a switch plate 25 is provided at the point of communication. The switch plate 25 is selectively switched by means of a solenoid 23 and a spring 24 to guide the ice pieces from the ice storing portion 1b to the cup 22 or to guide the ice pieces into the ice storing cylinder 16. More specifically, when the solenoid 23 is energized, the plunger 23a is attracted, so that a switch lever 26a coupled to the plunger 23a is displaced. Accordingly, the switch plate 25 coupled to the lever 25a is moved to close an ice inlet at the upper end of the ice storing cylinder 16, as shown in FIG. 2. When the solenoid 23 is deenergized, the plunger 23 is retracted by the spring 24, so that the lever 25a is displaced and the switch plate 25 opens the ice inlet at the upper end of the ice storing cylinder 16, as shown by a dotted line in FIG. 2. Accordingly, when the solenoid 23 is energized, the ice pieces coming from the ice storing portion 1b to the ice dispensing chute 4 are guided into the cup 22, whereas when the solenoid 23 is deenergized, the ice pieces in the ice dispensing chute 4 are guided through the branch chute 26 to the ice storing cylinder 16.

An ice detecting lever 27 is provided at the end portion of the branch chute 26, as shown in FIG. 2. The ice detecting lever 27 detects the ice in the ice storing cylinder 16 and is provided integrally with an acting lever 29 and rotatable about the axis 28. The acting lever 29 functions to depress an actuator of an ice detecting switch 30, so that the switch 30 is turned on or off. More specifically, if and when the acting lever 29 is brought into a position shown in FIG. 2, the acting lever 29 depresses the actuator of the switch 30, when the switch 30 is turned off. On the other hand, if and when ice is supplied through the chutes 4 and 26 to the ice inlet of the ice storing cylinder 16, the ice detecting lever 27 is depressed by the ice as supplied, so that the ice detecting lever 27 is turned about the axis 28. Accordingly, the acting lever 29 coupled to the lever 27 is separated from the actuator of the ice detecting switch 30. At that time, the ice detecting switch 30 is turned on. Accordingly, if and when the ice storing cylinder 16 is filled with ice pieces, the ice detecting lever 27 remains depressed by the ice, so that the acting lever 29 is separated from the ice detecting switch 30, with the result that the ice detecting switch 30 remains on. The signal obtained from the ice detecting switch 30 is used as a signal representing that the ice storing cylinder 16 is filled with the ice pieces.

Referring again to FIG. 1, several kinds of source powder, such as tea, cocoa, sugar, coffee, cream and the like are put into source material containers 31, 32, 33, 34 and 35. These source material containers 31 to 35 are provided with source material dispensers 36 at the lower ends thereof. Each source material dispenser 36 comprise a stirring wheel 37 having a plurality of protrusions on the outer peripheral edge, and a screw 39 being driven by a motor 38. If and when a certain kind of drink is designated upon insertion of a coin into the automatic vending machine, a dispensing signal is applied to the corresponding source material dispenser. Then the motor 38 is energized for a given time period, so that the stirring wheel 37 and the screw 39 are rotated, whereby a predetermined quantity of the source material powder is dispensed from a dispensing port 40. A dissolver 41 is provided for the source material containers 31 and 32 for such source material powder as tea and coffee. The dissolver 41 cooperates with the respective source material dispensers 36 through the chutes 51. A further dissolver 41 is provided for the source material dispensers 36 of the source material containers 33, 34 and 35 of source material powder such as sugar, coffee and cream. The further, dissolver 41 cooperates with each of the respective source material dispensers 36 through a common chute 52.

The dissolvers 41 comprise a stirring bowl 42, as shown in FIG. 4. The stirring bowl 42 is provided with a dispensing port 43 at the bottom of the stirring bowl 42 and a stirring impeller 44 above the dispensing port 43. The stirring impeller 44 is coupled to a motor 46 by means of a flexible shaft 45, so that the materials in the stirring bowl 46 are stirred upon energization of the motor 46. The motor 46 is fixed to a frame extending from the side surface of the bowl 42. The outlets of water supplying pipes 47, 48 and 49 extend into an upper opening of the stirring bowl 42. The outlets of the chutes 51 and 52 for guiding the materials into the bowl 42 from the source material dispenser 36 also extend into the opening of the stirring bowl. The water supplying pipes 47, 48 and 49 are coupled to a hot water tank 56, so that the hot water is introduced into the corresponding dissolvers 41 under control of magnetic valves 53, 54 and 55. Accordingly, the material as dispensed from the source material dispenser 36 is guided into the stirring bowl 42 through the chute 51 or 52, while the hot water is guided from the hot water tank 56 through the water supplying pipe 47, 48 or 49 to the bowl 42. Upon energization of the motor 46 and rotation of the stirring impeller 44, the source materials and the hot water are stirred in the bowl 48. After stirring the resultant mixture is guided through a conduit 50 coupled to the dispensing port 43 provided at the bottom of the bowl to the cup 22.

Conduits 57, 58 and 59 branch off from the water supplying pipes 47, 48 and 49. These conduits 57, 58 and 59 are coupled through electromagnetic valves, respectively, to a cold water circulating pipe 63. One end of the cold water circulating pipe 63 communicates through the pump 64 with the cold water outlet 18 of the cold water tank 12. The other end of the pipe 63 extends to a point above the sustain tank 3. Accordingly, upon driving the pump 64, cold water is fed from the cold water tank 12 through the conduit 63 and through the branch pipes 57, 58 and 59 to the corresponding water supplying pipes 47, 48 and 49, respectively. Accordingly, upon driving of the pump 64 and opening of the electromagnetic valve 60, 61 or 62, cold water is supplied to the corresponding dissolver 41. Surplus cold water is returned to the sustain tank 3.

A float switch 65 is provided in the hot water tank 56 for for controlling the electromagnetic valve 67 to control a supply of the water through the water supply pipe 66 to the hot water tank 56, thereby to maintain the water level in the hot water tank 56 constant. A heater 68 is provided in the hot water tank 56 for heating the water reserve in the tank 56. A supply of electricity to the heater 68 is controlled by a temperature controlling thermostatic switch 69, so that the temperature of the hot water in the hot water tank 56 is maintained constant. A bucket 70 shown in FIG. 1 is used to receive any drain-off liquid which is produced by the ice making machine 1 and the tanks 3, 12 and 56. The pump 64 provided in the cold water circulating pipe 63 is energized, if and when the water level in the sustain tank 3 comes below the position of the high level switch 8 and a cold drink is to be vended, whereby cold water in the cold water tank 12 is supplied to the pipe 63. The electromagnetic valve 10 is excited if and when the water level in the cold water tank 12 falls below the position of the high level switch 14, thereby to supply water into the sustain tank 3 and thus to the cold water tank 12.

In the embodiment shown in FIG. 1, ice pieces made by the ice making machine 1 are stored in the ice storing portion 1b. The ice pieces are dispensed to the dispensing chute 4 upon energization of the gate driver 7 and upon opening of the gate 6. If and when the switch plate 25 is brought to the position as shown in FIGS. 1 and 2, then all the dispensed ice cubes are discharged into the cup 22. If and when the switch plate 25 has been brought to a position shown by the one dotted line in FIG. 2, then the dispensed ice cubes are supplied to the ice storing cylinder 16. The water in the cold water tank 12 is always in contact with the ice pieces in the ice storing cylinder 16 through the communicating aperture 20 and as a result the water is cooled by the fusion heat of the ice.

In the case where tea is to be vended, for example, when a purchaser selects tea and as a result a corresponding dispensing signal is generated. Then the motor 46 is first driven, so that the impeller 44 starts rotating. Then the electromagnetic valve 53 is opened for a short time period and thereafter is closed, whereby a small quantity of hot water, say 30 cc, is fed from the hot water tank 56 to the water supply pipe 47. At the same time the motor 38 of the source material dispensing machine 36 provided below the source material containers 31 is driven for a predetermined time period, so that a predetermned quantity of tea is introduced through the chute 51 to the stirring bowl 42 of the dissolver 41. Since at that time the impeller has been rotating as described previously, the hot water and the introduced source material are stirred at a high speed in the bowl 42, without the hot water flowing into the conduit 51 by virtue of a centrifugal effect.

If a cold drink has been selected, a further predetermined time period thereafter the electromagnetic valve 60 is energized for a predetermined time period, so that a predetermined quantity e.g. about 70 cc, of the cold water in the cold water tank 12 is fed through the pipe 63 to the pump 64, through the conduit 57 and the water supply pipe 47 to the stirring bowl 42. The motor 46 is deenergized after a predetermined time period, so that the stirring impeller 44 stops, when the liquid mixture flows by its own weight from the discharging port 43 of the bowl 42 through the conduit 50 into the cup 22. At the same time, the gate 6 is opened for a predetermined time period, whereby a given quantity of ice cubes of 40 g, for example, is supplied through the chute 4 to the cup 22.

If a hot drink has been selected, the cold water path is interrupted and the electromagnetic valve 53 is opened for a predetermined time period, so that a predetermined quantity of hot water of 95 cc, for example, is supplied from the hot water tank 56 through the conduit 47 to the stirring bowl 42. In this case the ice dispensing gate 6 is not opened as a matter of course. Substantially the same applies to the vending operation of a cocoa drink.

In the case of coffee, the corresponding source material dispensers 36 of the source material containers 33, 34 and 35 are operated, so that the respective predetermined quantities of sugar, coffee source material and cream powder are introduced through the chute 52 into the dissolver 41. The materials are mixed into the hot water and/or the cold water and the resultant mixture is supplied from the stirring bowl 42 through the conduit 50 to the cup 22.

As seen from the foregoing description, according to the automatic vending machine of the above described embodiment, a cold drink is vended, by first mixing source material powder into a small quantity of the hot water, by adding a predetermined quantity of the cold water to suitably dilute the mixture and at the same time to lower the temperature of the mixture, and by putting ice pieces into the mixture, thereby to provide a cold drink. In the course of the above described process, the cold water is further cooled by the heat of fusion of the ice made by the ice making machine. Accordingly, the energy efficiency for making cold water is enhanced as compared with the conventional systems.

Figure 5:
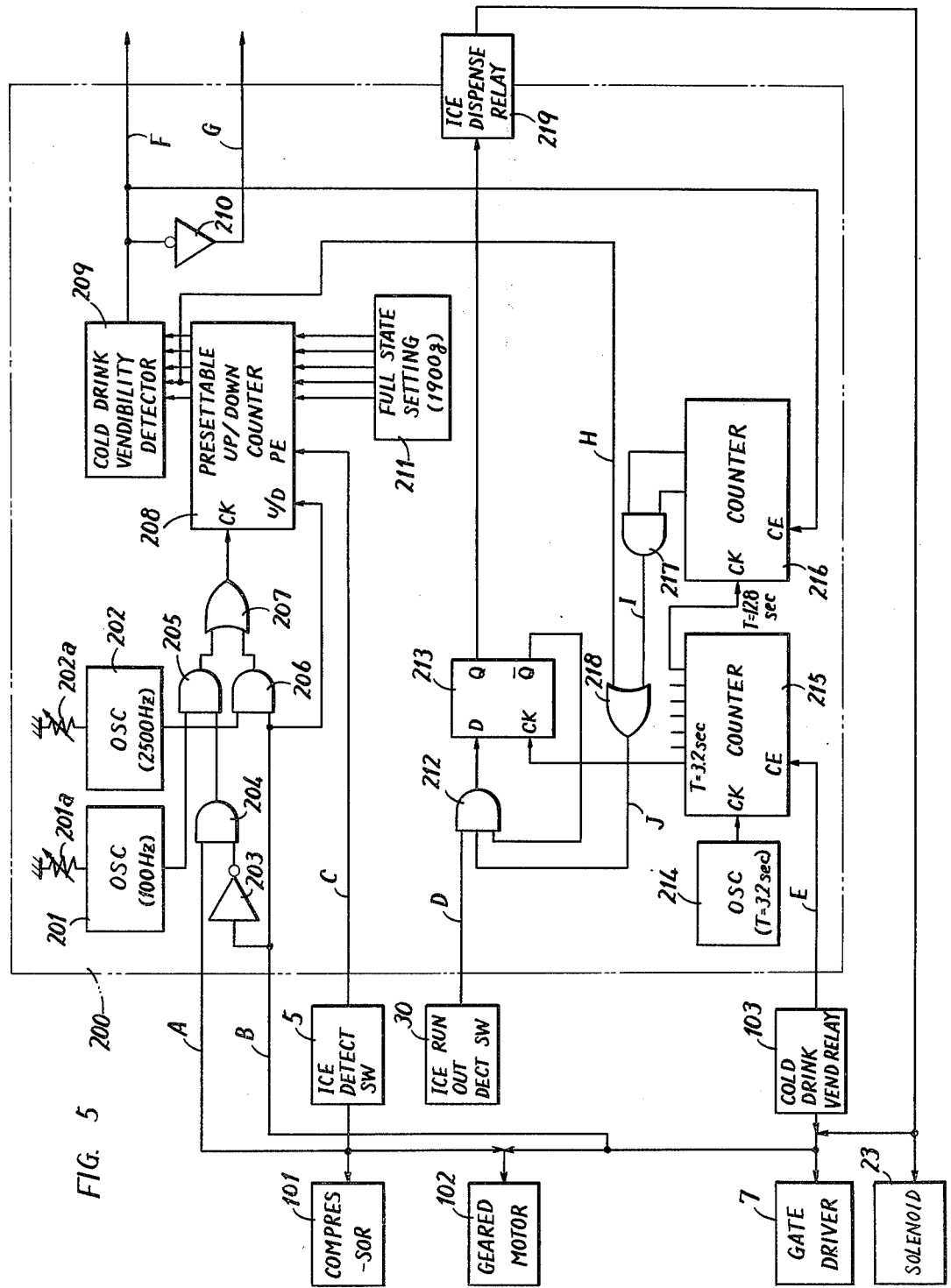
FIG. 5 is a block diagram showing one example of a control circuit for controlling the operation of an ice making machine as shown in the FIG. 1 embodiment.

Now referring to FIG. 5, a control of the ice making machine 1 constituting one of the features of the embodiment will be described in the following. FIG. 5 is a block diagram showing circuit portions associated with a drive control circuit 200 of the ice making machine 1. The ice "full" switch 5 located above the ice storing cylinder 16 shown in FIG. 1 provides a signal which enables the geared motor 102 for driving the compressor 101 housed in the casing 1c (FIG. 1) of the ice making machine 1 and the screw (not shown) in the cylindrical portion 1a of the ice making machine 1 if the ice storing cylinder 16 is not filled with ice and disables the geared motor 102 if the ice storing cylinder 16 is filled with ice. At the same time the signal is applied to the drive control circuit 200 as a signal A representative of an operational state of the ice making machine 1. More specifically, the signal A becomes a high level or logic "one" signal when the ice making machine operates and otherwise it becomes a low level or logic "zero" signal. The cold drink vending relay 103 provides a signal which enables the gate driver 7 for driving the ice dispensing gate 6 (FIG. 1) and the geared motor 102. At the same time the signal is applied to the drive control circuit 200 as a signal B representing an ice dispensing state, such that the signal B assumes a high level when the gate 6 is opened by the gate driver 7. The signal A is applied to one input of an AND gate 204, while the signal B is inverted by an inverter 203 and the inverted output is applied to the other input of the AND gate 204. The signal B is also applied to one input of an AND gate 206 and to the terminal U/D of a presettable up-/down counter 208 as a selection command of an up count or down count operation. More specifically, the counter 208 operates in a down count mode when the signal B is at the high level and in an up count mode when the signal B is at the low level. The output of the AND gate 204 is applied to one input of an AND gate 205 and the oscillation output of the oscillator 201 is applied to the other input of the AND gate 205. The oscillator 201 comprises a pulse oscillator of a repetition frequency of approximately 100 Hz, for example, for setting the ice making capability of the ice making machine 1. To that end, the oscillation cycle may be changed by means of a variable resistor 201a, for example. The other input of the AND gate 206 is connected to receive the oscillation output of the oscillator 202.

The oscillator 202 comprises a pulse oscillator having a repetition frequency of 2500 Hz, for example, for setting the ice dispensing capability. To that end, the oscillation cycle may be changed by means of a variable resistor 202a, for example. The outputs of the AND gates 205 and 206 are applied through an OR gate 207 to a count input terminal CK of a presettable up/down counter 208.

A signal C representing whether the ice storing portion 1b has been filled with ice pieces is obtained from the ice detecting switch 5 provided at the upper portion of the ice storing portion 1b shown in FIG. 1. If the ice storing portion 1b is filled with ice pieces, the signal C assumes the high level. The signal C is applied to a preset enable terminal PE of the presettable up/down counter 208. Accordingly, if the signal C is at the high level, the counter 208 presets the preset data set in the ice full state setting device 211. The ice full state setting device 211 provides data concerning the quantity of the stored ice in the ice storing portion 1b and is selected to set the data corresponding to the ice pieces of say 1900 g. The count output of the counter 208 is applied to a cold drink vendibility detector 209. The cold drink vendibility detector 209 is adapted to provide a vendibility signal F as a high level signal based on the count data in the counter 208, if the ice pieces of say 400 g are stored in the ice storing portion 1b of the ice making machine 1. An unvendibility signal G is an inversion of the signal F obtained by an inverter 210. These signals F and G are applied to energize lamps and the like, not shown, thereby to indicate whether or not a cold drink is vendible.

An ice "run out" detecting switch 30 as shown in FIG. 2 provides a signal D representing whether the ice pieces for the cold water and thus the ice pieces in the ice storing cylinder 16 exceed a predetermined quantity. The signal D assumes the high level, if the switch 30 is kept turned on, i.e. if the quantity of ice pieces in the ice storing cylinder 16 falls below a prescribed value. The signal D is applied to one input of a three-input AND gate 212. The output of the AND gate 212 is applied to the data input D of a D-type flip-flop 213. The non-inverted output Q of the flip-flop 213 is applied as an energization signal to the ice dispensing relay 219, while the inverted output $\bar{Q}$ of the flip-flop 213 is applied to one input of the above described AND gate 212. The oscillator 214 comprises a pulse oscillator oscillating at the cycle of approximately 0.8 cycles per second, thereby to generate a timing clock signal for the counters 215 and 216. The output of the oscillator 214 is applied to a count input terminal CK of the counter 215. The counter 215 receives the signal E from the cold drink vending relay 103 at the count enable terminal CE. The signal E assumes the low level, if and when the cold drink vending relay 103 is operated and a cold drink is being dispensed, whereby the counter 215 is disabled. The output as obtained at every 3.2 seconds out of the count outputs of the counter 215 is applied to the above described D-type flip-flop 213 as a clock input CK. On the other hand, the output as obtained at the high level or the low level at every 6.4 seconds out of the outputs of the counter 215 is applied to the count input terminal CK of the counter 216. The count enable terminal CE of the counter 216 is supplied with the above described cold drink vendibility signal F. Accordingly, if the counter 216 is enabled to count, a cold drink becomes vendible. The output of the counter 216 is applied to the AND gate 217. The output signal I from the AND gate 217 assumes the high level after the counter 216 has counted for a predetermined length of time, for example 9 minutes. The high level is maintained for about 25.6 seconds. The signal I is applied to one input of an OR gate 218. The other input of the OR gate 218 is connected to receive the signal H obtained from the above described presettable up/down counter 208. The signal H assumes the high level, if the count value in the counter 208 reaches a value corresponding to 300 g. The output of the OR gate 218 is applied to the remaining one input of the AND gate 212. The non-inverted output $\bar{Q}$ of the D-type flip-flop 213 may be applied through a differentiation circuit, not shown. The gate driving circuit 7 is energized or deenergized in response to the relay contact (not shown) of the ice dispensing relay 219.

The operation of the FIG. 5 embodiment will be described with reference to FIG. 5A.

At the beginning of the operation, it is assumed that the power supply (not shown) has been already turned on and a predetermined quantity of water has been stored in the sustain tank 3. In the initial condition, the ice "full" state switch 5 is turned off. Accordingly, the compressor 101 and the geared motor 102 are energized and the signal A assumes the high level. On the other hand, the signal from the gate driving circuit 7 and thus from the ice dispensing relay 219 remains at the low level. Therefore, the output from the AND gate 204 assumes the high level and the AND gate 205 is opened. Accordingly, the pulse output of 100 Hz obtained from the oscillator 201 is applied through the gate 205 and the OR gate 207 to a count clock of the presettable up/down counter 208. Since, the signal B is at the low level at that time, the counter 208 has been enabled for an up count mode. Accordingly, the counter 208 counts up responsive to the pulses of 100 Hz obtained from the oscillator 201. At that time, the ice making machine 1 operates whereby ice pieces are being manufactured. Accordingly, the count value of the counter 208 represents the quantity of the ice cubes stored in the ice storing portion 1b made by the ice making machine 1. If the counter 208 exhibits the count value of "10000", it is assumed that ice cubes of 100 g have been stored in the ice storing portion 1b. When the counter 208 reaches the count value of "30000", it is assumed that ice pieces of 300 g have been stored. If the counter 208 counts "30000" and the ice storing portion 1b stores the ice pieces of 300 g, the signal H assumes the high level at the timing t1 shown in FIG. 5A and accordingly the output J of the OR gate 218 also assumes the high level.

The counter 208 is structured such that the output is changed when the count value reaches an integer multiple of "10000" corresponding to an integer or fractional multiple of 100 g of ice. Accordingly, the counter output shows 200 g when the stored ice quantity is 200 g to 299.99 g and the counter output shows 300 g when the stored ice quantity is 300 g to 399.99 g.

On the other hand, the D-type flip-flop 213 assumes in an initial condition a state wherein the inverted output $\bar{Q}$ is at the high level. At the same time, the signal D obtained from the ice "run out" detecting switch 30 is also at the high level because ice pieces in the ice storing cylinder 16 have run out. Accordingly, the output of the three-input AND gate 212 also assumes the high level, so that the terminal D of the flip-flop 213 assumes the high level. On the other hand, the pulse of the cycle of say 0.8 second obtained from the oscillator 214 is counted by the counter 215. The left end terminal of the counter 215 repetitively provides the high level pulse at every 3.2 seconds interval. The D-type flip-flop 213 is set at the rise of the output of the counter 215 and the non-inverted output Q thereof assumes the high level. When the output Q of the flip-flop 213 assumes the high level, the ice dispensing relay 219 is energized, so that the switch solenoid 23 is energized by the output of the contact of the relay 219. As a result, the switch plate 25 is turned to a state as shown by the dotted line in FIG. 2, whereby the ice pieces obtained from the ice dispensing chute 4 are guided through the branch chute 26 to the ice storing cylinder 16. At the same time, the gate driving circuit 7 is energized by the output of the relay contact of the ice dispensing relay 219, so that the gate 6 of the ice storing portion 1b is opened. Since the geared motor 100 has been already energized at that time, the ice pieces are pushed out from the cylindrical portion 1a of the ice making machine and are dispensed through the ice dispensing chute 4. The signal B assumes the high level by virtue of the contact of the ice dispensing relay 219.

If the signal B assumes the high level, the presettable up/down counter 208 is switched to the down count mode. At the same time, the AND gate 205 is closed and instead the AND gate 206 is opened. Accordingly, the pulse output of 2500 Hz obtained from the oscillator 202 is applied through the AND gates 206 and 207 to the count input of the counter 208, whereby, the counter 208 counts down responsive to the pulse obtained from the oscillator 202. On the other hand, if a time period of 3.2 second is timed by the counter 215 which counts in response to the output of the oscillator 214, the left end terminal assumes the high level and the clock input of the D-type flip-flop 213 assumes the high level. Since the inverted output $\bar{Q}$ of the flip-flop 213 has already been at the low level, the data input D is also at the high level and the flip-flop 213 reverts the state thereof responsive to the low level clock input obtained from the counter 215. Accordingly, the non-inverted output Q of the flip-flop 213 turns to the low level and as a result the ice dispensing relay 219 is deenergized. Hence, the switching solenoid 23 and the gate driving circuit 7 are deenergized through the relay contact, whereby the ice dispensing is terminated. On the other hand, the counter 208 has reached a count value corresponding to 220 g (=300 g−80 g) at that time. The reason is that the time period of 3.2 seconds is timed by the counter 215, which time period is that required for dispensing 80 grams of ice pieces from the ice making machine 1. Accordingly, the signal H obtained from the counter 208 assumes the low level, since the ice pieces in the ice storing portion 1b becomes less than 300 g. Therefore, the output of the OR gate 218 also assumes the low level and the output of the AND gate 212 and thus the data input D of the flip-flop 213 remains at the low level. Therefore, the flip-flop 213 does not change its state even if the high level clock signal is applied from the counter 215 after the lapse of 3.2 seconds, whereby the non-inverted output Q remains at the low level. Meanwhile, although ice pieces of approximately 3.2 g are made by the ice making machine 1 during the ice dispensing period, i.e. during the time period of 3.2 second, such an error component may be neglected for the moment for simplicity of explanation.

Similarly, if the ice pieces of 300 g are made by the ice making machine 1, i.e. if the count value of the counter 208 becomes a count value corresponding to 300 g, the signal H again turns to the high level, so that the ice dispensing relay 219 is again energized, whereby ice is dispensed for a time period of 3.2 seconds. Such ice dispensing operation is repeated four times and, when the ice pieces of 320 g are stored in the ice storing cylinder 16, the ice "run out" detecting switch 30 is turned off and the ice "run out" detecting signal D also assumes the low level. Accordingly, the D-type flip-flop 213 is kept unchanged.

Even after the timing t2 shown in FIG. 5A, the compressor 101 and the geared motor 102 are kept energized, so that the ice making machine 1 continues making ice. If the count value of the counter 208 become a count value corresponding to 400 g as shown at the timing t3, the signal F obtained from the cold drink vendibility detector 209 assumes the high level. Thus, the signal G remains at the high level and a cold drink is vendible until the signal F assumes the high level. Thus, in the embodiment shown, if the ice pieces of 400 g are stored in the ice making machine 1 and thus in the ice storing portion 1b, a cold drink becomes vendible. However, in a conventional apparatus, a cold drink did not become vendible, unless the ice storing portion 1b is filled with ice pieces by amounting to, for example 1900 g. Therefore, according to the present invention, a time period in which a cold drink becomes vendible has been considerably shortened, as compared with the prior art. A cold drink becomes vendible if ice pieces of 400 g are stored in the ice storing portion 1b, provided that cold water has been prepared. Otherwise, a drink of a poor quality, i.e. a much less cooled drink would be dispensed. However, since the embodiment shown is adapted such that at the beginning of operation ice pieces for making cold water, i.e. the ice pieces in the ice storing cylinder 16 are necessarily prepared in a preferential manner, the cold water tank 12 has been filled with ample cold water of a much lower temperature when the vendibility signal F turns to the high level. Therefore, according to the embodiment shown, a time period from the initial operational state to a cold drink vendible state is drastically shortened, without fear of dispensing cold drinks of a poor quality.

Even if the signal F turns to the high level, i.e. a cold drink becomes vendible at the timing t3, the compressor 101 and the geared motor 102 are kept energized, so that the ice making machine 1 continues to make ice pieces. It is assumed that at the timing t4 shown in FIG. 5A a full ice quantity such as 1900 g is stored in the ice storing portion 1b. Then, at the timing t4 the "ice full" state switch 5 is turned on and accordingly the compressor 105 and the geared motor 102 are deenergized at the timing t4. At the same time as the "ice full" state switch 5 is turned on, the "ice full" state signal 4 turns to the high level, so that the preset enable signal PE is applied to the presettable up/down counter 208. Then the data set in the ice "full state" quantity setting device 211 such as the data corresponding to the full state quantity of 1900 g is preloaded in the counter 208. As a result, the previously described minor errors or any other errors caused by a variation of the ambient temperature and the like or a variation of the ice making capability are corrected.

On the other hand, ice cubes of 400 g are stored sooner in the ice storing portion 1b, as compared to a full supply of 1900 g so that a cold drink becomes vendible, when the count enable signal CE of the counter 216 which has been at the low level assumes the high level. More specifically, the counter 216 is enabled for the first time when a cold drink becomes vendible. The reason is that, although the counter 216 is intended to generate a timing signal for investigating the presence or absence of ice pieces in the ice storing cylinder 16, it is not necessary to detect the presence or absence of ice in the ice storing cylinder 16 before a cold drink becomes vendible. When a time period of approximately nine minutes is timed by the counter 216, the output signal I of the AND gate 217 assumes the high level. The signal I maintains the high level until after the lapse of approximately 25.6 seconds by the counter 216. The high level signal I obtained from the AND gate 217 is applied through the OR gate 218 to the AND gate 212. If the ice "run out" detecting switch 30 has been turned on at the time, i.e. if the ice in the ice storing cylinder 16 is less than a predetermined quantity, the data input of the D type flip-flop 213 assumes the high level, so that the flip-flop 213 reverts to the state responsive to the rise of the clock signal obtained from the counter 215. Therefore, if the ice in the ice storing cylinder 16 is less than a predetermined quantity, the non-inverted output Q of the flip-flop 213 assumes the high level and accordingly the ice dispensing relay 219 is energized. If the ice "run out" detected signal D remains at the low level during a time period when the signal I is at the high level, the flip-flop 213 maintains the previous state, so that the ice dispensing relay 219 is not energized. Even if the ice dispensing relay 219 is thus energized, the switching solenoid 23, and the gate driving circuit 7 and the geared motor 102 are energized and the ice pieces made by the ice making machine 1 are dispensed into the ice storing cylinder 16 by virtue of the switching of the switching plate 25, the ice "run out" detecting switch 30 still remains on for a time period of 3.2 second (a time period determined by the counter 215) thereafter, so that if the signal D remains the high level the ice dispensing relay 219 is again energized. However, such dispensing of ice pieces into the ice storing cylinder 16 is restricted by the output of the counter 216, i.e. by the output I of the AND gate 217. More specifically, the signal I obtained from the AND gate 217 remains the the high level for a time period of 25.6 second and thereafter turns to the low level. The flip-flop 213 is set or reset responsive to the clock signal at every 3.2 second obtained from the counter 215. Accordingly, during a time period when the signal I is at the high level, i.e. during a time period of 25.6 second, the ice dispensing relay 219 is only energized four times at the most. The reason why a supply of ice blocks into the ice storing cylinder 16 in the course of the vending operation is restricted to four times at the most will be described in the following. If cold drinks are vended, fresh city water is supplied to the cold water tank 12, so that the ice in the ice store cylinder 16 decreases more and more, which necessitates a continual supply of ice into the ice storing cylinder 16. However, preference of a supply of ice into the ice storing cylinder 16 causes a shortage of ice for use in a direct supply of ice into the cup 22, with the result that the number of cups that can be continually vended could be reduced. Therefore, the embodiment is adapted such that the maximum number of ice supply is restricted to four times, so that during a time period when cold drinks are vendible, a preference is afforded to storing of the ice in the ice storing portion 1b.

Now a vending and dispensing operation of cold drinks will be described in the following. If a given kind of cold drink is designated, the cold drink vending relay 130 is energized. The gate driving circuit 7 and the geared motor 102 are operated by the contact of the relay 103, so that the ice is dispensed from the ice storing portion 1b to the dispensing chute 4. On the other hand, in the course of making ice, the geared motor 102 and the compressor 101 are kept energized, so that the switching solenoid 23 is kept deenergized. In such a state, the ice as dispensed into the chute 4 is guided into the cup 22 (FIG. 1). Furthermore, the ice dispensing signal B assumes the high level by virtue of the contact of the cold drink vending relay 103. The high level signal B is applied to the terminal U/D of the presettable up/down counter 208. Accordingly, the counter 208 is enabled in the down count mode, when the terminal CK of the counter 208 has been supplied with the pulse of 2500 Hz from the oscillator 202. The energizing time period of the cold drink vending relay 103 has been restricted to approximately 1.6 seconds, i.e. a time period required for dispensing the ice of approximately 40 g into the cup 22. At the same time, the cold drink dispensing signal E assumes the low level by virtue of the contact of the relay 103 and the count enable signal CE of the counter 215 assumes the low level, so that a counting operation of the counter 215 is terminated. As a result, during a time period when the ice has been dispensed into the cup, the counter 215 does not count. More specifically, insofar as the counter 215 is continuing a counting operation, it could happen that the timing operation by the counter 216 exceeds more than nine minutes. Even if a chance is available to detect the presence or absence of ice in the ice storing cylinder 16 during the ice dispensing operation, the same is disabled, with the result that ice is not detected again in the ice storing cylinder 16 unless a time period of more than eighteen minutes expires at the most. Accordingly, although the situation is different depending on the temperature circumstances, sufficiently cold water is not available in such a situation, with the result that the quality of cold drinks being vended by the cups is degraded.

If the count value of the counter 208 becomes lower than the count value corresponding to 400 g, the cold drink unvendibility signal G assumes the high level as a matter of course, so that cold drinks are not dispensed any more.

As described in the foregoing, the embodiment is structured such that a portion of the ice pieces made by the ice making machine is discharged into the ice storing cylinder of the cold water tank, for example, so that the water is cooled by the heat of fusion of the ice. As a result, an improved energy efficiency is achieved. The water in the cold water tank is raised to the sustain tank by means of the pump, so that the sustain tank is shared by the ice making machine and the cold water tank, with the result that a closed circuit is provided for the water in the sustain tank 3, in the ice making machine 1 and in the cold water tank 12. Accordingly, unless ice or cold water is externally discharged, the closed circuit is not supplied with any water from any other portion, with the result that the water in the sustain tank is maintained at a lower level. Therefore, the quality of ice made by the ice making machine is good, while the cold water making speed is fast, without the necessity of a thermal control such as a thermostat.

In a situation where no ice is dispensed because no vending operation takes place for a longer period of time such as during the night, small ice cubes could freeze together to form a larger block of ice in the ice storing portion 1b of the ice making machine. In the a case, such large ice mass is not divided into smaller ice pieces during the following vending operation and a serious trouble could occur. However, according to the above described embodiment of the invention such trouble is avoided, because ice cubes are supplied from the ice making machine to the ice storing cylinder of the cold water tank, whereby the ice in the ice making machine is always divided into small ice pieces and ice of an excellent quality can be always supplied.

Furthermore, in the above described embodiment, the branch chute 26 is provided in the ice dispensing chute 4 connected to the ice making machine 1, whereby ice dispensing is switched between the cup or the ice storing cylinder 16; however, alternatively two dispensing means may be provided in the ice storing portion 1b, by separately arranging a chute for guidance to the cup 22 and a chute for guidance into the ice storing cylinder 16.

Furthermore, in the FIG. 1 embodiment, the cold water is dispensed by means of the electromagnetic valves 60, 61 and 62 provided midway in the circulating pipe 63 having the pump 64; however, a separate cold water supply pipe may be provided independently of the circulating pipe 63, and a separate cold water dispensing pump may be provided. Alternatively, a supply of cold water may be achieved by simply providing a cold water tank at a higher position, so that the water automatically flows down.

The switching of the switching plate 25 used in the embodiment shown in FIGS. 1 and 2 may be achieved in the following different manner. FIG. 6 shows the principle of such a different type of switching device. Referring to FIG. 6, the reference numeral 71 denotes a switching member which corresponds to the switching plate 25 described above. The switching member 71 is supported for tilting to the left and right about the shaft 72. The stops 73 and 74 are provided at the left and right positions corresponding to the end position of the switching member 71, so that the turning of the switching member 71 is restricted by these stops 73 and 74. An engaging portion is provided at the center of the switching member 71, and one end of a spring 76 is connected to the engaging portion. The other end of the spring 76 is connected to a sliding member 75. The sliding member 75 is slidable in the turning direction of the switching member 71 as shown by the arrow in FIG. 6.

As shown in FIG. 6, the switching member 71 abuts against the right side stop 74, as shown by the solid line. On the other hand, if the sliding member 75 is on the right side of the fulcrum 72, a contracting force by the spring 76 is exerted to turn the switching member 71 further to the right. Accordingly, the switching member 71 abuts against the top 74 and is stationary. Similarly, if the sliding member 75 is moved leftward to be brought to the left side of the fulcrum 72, the center line of the spring 76 moves to the left side of the fulcrum 72. Accordingly, the switching member 71 is turned leftward to abut against the left side stop 73 and is brought to a stop.

FIGS. 7 to 9 are views showing a major portion of the example in which the switching gate of the shown in FIG. 6 is incorporated in the FIG. 1 embodiment. The switching plate 25 corresponding to the switching member 71 shown in FIG. 6 is rotatably supported by the shaft 81 in the ice dispensing chute 4. The stops 82 and 83 for the switching plate 25 are fixed in the ice dispensing chute 4. The shaft 81 is turned together with the switching plate 25, and one end of the shaft 81 is shaped as a bent crank portion 86 outside of the ice dispensing chute 4. A spring 85 is connected to the free end of the bent crank portion 86. The sliding member 84 corresponding to the sliding member 5 shown in FIG. 6 is a plate member with an L shaped cross-section. One end of the sliding member 84 is coupled to a plunger 88 of the solenoid 23 by means of the shaft 89. The switching solenoid 23 is fixed to the supporting plate 87 outside of the dispensing chute 4. One end of the spring 90 is coupled to the other end of the sliding member 84, while the other end of the spring 90 is coupled to the supporting frame 93 fixed to the ice dispensing chute 4. Accordingly, the spring 90 pulls the sliding member 84 in the direction opposite to that of the solenoid 23. A notch 91 is formed on the side portion of the sliding member 84. The tip end of the bent crank portion 86 is fitted into the notch 91, so that when the sliding member 84 moves more than a predetermined distance the notch 91 pushes the bent crank portion 86. One end of the spring 85 is coupled to the center of bent edge 92 of the sliding member 84, while the other end of the spring 85 is coupled to the bent crank portion 86.

FIGS. 7 to 9 show a case where the switching solenoid 23 is deenergized whereby the sliding member 84 is pulled downward by the spring 90, as viewed in FIGS. 7 and 8. Since the center line of the spring 85 is below the shaft 81, the switching plate 25 abuts against the stop 83, so that the opening 94 provided in the ice dispensing gate 4 is opened. The opening 94 communicates with the branch chute 26 shown in FIG. 6, for example. Accordingly, in such a state, the ice from the ice dispensing chute 4 is guided into the ice storing cylinder 16.

Now, if the switching solenoid 23 is energized, the moving spring 85 is pulled upward as viewed in FIGS. 7 and 8, together with the plunger 88, so that the sliding member 84 coupled thereto moves upward against the force of the spring 90. Since the connecting point of the spring 85 and the bent edge 92 of the sliding member 84 exceeds the center of the shaft 81, the bent crank portion 86 is turned about the shaft 81 together with the switching plate 25. The switching plate 25 abuts against the stop 82, as shown by dash dotted lines in FIG. 8, so that the opening 94 is closed. In the case where the above described function is late, the notch 91 pushes the bent crank portion 86, thereby to assure the movement of the bent crank portion 86 and of the switching plate. If the opening 94 is closed, the ice as dispensed to the ice dispensing chute 4, is guided into the cup.

According to the embodiment shown in FIGS. 6 to 9, a simple structure of connecting a portion of the switching member turning about the fulcrum with the sliding member 84 by means of a spring is employed whereby the switching member (switching plate) is switched only by a movement of the sliding member, while the switching member abuts against the stop under the force of the spring, which assures the switching operation. According to the above described embodiment, the switching member (switching plate) is not directly moved but is indirectly moved through the spring by means of the sliding member. As a result, even in case where a driving device of a large shock such as a solenoid is employed, a shock is not transferred directly to the switching member. Furthermore, the above described structure makes it possible to move more the switching member to an extent larger than the respective movement of the sliding member.

In the above described embodiment, means for detecting whether the ice for making the cold water is more than a predetermined quantity or not are disclosed which use a displacement of a plate, but other suitable means may be used for this purpose such as a photoconductive switch, a detector operable in response to a variation of the weight of the ice as stored, a detector for detecting a variation of the entire electrical resistance of the ice as stored.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic cup drink vending machine for preparing a cup for vending, putting a source material, cold water and ice into the cup to produce a mixture, thereby to dispense the mixture as a cold drink, comprising: water supplying means for supplying water, ice making means for making ice from the water supplied by said water supplying means, cold drink dispense commanding means for commanding dispensing of said cold drink, first ice dispensing means responsive to the output of said cold drink dispense commanding means for dispensing a predetermined quantity of the ice made by said ice making means into said cup, cold water making means having a cold water tank and an ice storing portion located at least partially inside said cold water tank for storing said ice and for causing said stored ice to cool the water in said cold water tank supplied from said water supplying means, second ice dispensing means for dispensing the ice made by said ice making means into said ice storing portion of said cold water making means, cold water dispensing means responsive to the command output of said cold drink dispense commanding means for dispensing a predetermined quantity of cold water from said cold water making means, source material dispensing means responsive to the command output of said cold drink dispense commanding means for dispensing a predetermined quantity of source material, control means for controlling said ice making means and said ice dispensing means in accordance with the quantity of the ice required for being dispensed into said cup and the quantity of ice required by said cold water making means and wherein said ice making means comprises sustain tank means for receiving the water from said water supplying means, conduit means operatively connecting said sustain tank means to the inside of said ice making means for maintaining a constant water level inside of said ice making means, and further conduit means operatively connecting said cold water tank means with said sustain tank means for supplying said cold water tank means with water from said sustain tank means.

2. The automatic cup drink vending machine in accordance with claim 1, wherein said source material comprises at least powder and liquid, and which further comprises mixing means for mixing said source material dispensed from said source material dispensing means and cold water supplied from said cold water dispensing means for providing a mixture, said cup being adapted to receive said mixture from said mixing means.

3. The automatic cup drink vending machine in accordance with claim 1, wherein said source material is powder, and which further comprises hot water making means for heating the water supplied from said water supplying means for making hot water, first mixing means for receiving powder source material from said source material dispensing means and hot water from said hot water making means for mixing said powder source material and said hot water for providing a first mixture, and second mixing means for receiving said first mixture from said first mixing means and said cold water from said cold water dispensing means for mixing said first mixture and said cold water for providing a second mixture, said cup being adapted to receive said second mixture from said second mixing means.

4. The automatic cup drink vending machine in accordance with claim 1, wherein said source material is a liquid, said source material dispensing means is structured to directly dispense a predetermined quantity of source material liquid into said cup and said cold water dispensing means is structured to directly dispense a predetermined quantity of cold water into said cup, whereby said source material and said cold water are mixed together with said ice in said cup.

5. The automatic cup drink vending machine in accordance with claim 1, wherein said ice storing portion comprises communicating apertures for communication with said cold water tank means, whereby the water in said cold water tank means is cooled directly by the ice melting in said ice storing portion.

6. The automatic cup drink vending machine in accordance with claim 1 which further comprises cold water circulating means for returning said cold water in said cold water tank means into said sustain tank means.

7. The automatic cup drink vending machine in accordance with claim 6, wherein said cold water dispensing means comprises a branch pipe connected to said cold water circulating pipe means.

8. The automatic cup drink vending machine in accordance with claim 6 or 7, wherein said cold water tank means is located below said sustain tank means, and wherein said cold water circulating means comprise pipe means and pump means operatively connected in said pipe means for maintaining a cold water flow.

9. The automatic cup drink vending machine in accordance with claim 1, wherein said first ice dispensing means and said second ice dispensing means are separately coupled to said ice making means.

10. The automatic cup drink vending machine in accordance with claim 1, wherein said first ice dispensing means and said second ice dispensing means are coupled to a common ice dispensing means coupled to said ice making means, and said common ice dispensing means comprises switching gate means for switching a path to said first ice dispensing means or said second ice dispensing means.

11. The automatic cup drink vending machine in accordance with claim 10, wherein said switching gate means comprises a switching plate constructed to be displaceable to said first ice dispensing means or to said second ice dispensing means and for interrupting the passage of the corresponding ice dispensing means, a plunger coupled to said switching plate, a solenoid for attracting said plunger, and spring means coupled to said switching plate for urging said switching plate in the direction opposite to said attracting direction of said solenoid by said plunger, whereby when said solenoid is energized said switching plate is displaced to one of said first ice dispensing means and said second ice dispensing means, and when said solenoid is deenergized said switching plate is displaced by said spring means to the other of said first ice dispensing means and said second ice dispensing means.

12. The automatic cup drink vending machine in accordance with claim 10, wherein said switching gate means comprises a switching plate rotatably supported, a switching lever coupled to said switching plate and provided rotatably and integrally with said switching plate, a plunger coupled to the free end of said switching lever, a solenoid for attracting said plunger in one direction, and spring means coupled to the free end of said switching lever and urging said switching lever in the direction opposite to said one direction, whereby when said solenoid is energized said plunger and thus said switching lever is attracted in said one direction, so that said switching plate blocks one of said first ice dispensing means and said second ice dispensing means, and when said solenoid is deenergized said switching lever is urged in said opposite direction by means of said spring means, so that said switching plate blocks the other of said first ice dispensing means and said second ice dispensing means.

13. The automatic cup drink vending machine in accordance with claim 10, wherein said switching gate means comprise a switching plate constructed to be displaceable to said first ice dispensing means or to said second ice dispensing means and to be rotatable about an axis to block the corresponding ice dispensing means, two stop members adapted to abut against said switching plate in a switched position of said switching plate, a first spring coupled to said switching plate, and a sliding member also coupled to said first spring, said sliding member being slidable for moving said first spring so that a center line of said first spring moves over said axis as said sliding member moves, whereby said switching plate abuts against one of said two stop members, whereby one of said first and second ice dispensing means is blocked while the other is opened and vice versa.

14. The automatic cup drink vending machine in accordance with claim 13, wherein said switching gate means comprises a plunger coupled to said sliding member, a solenoid for attracting said plunger in one direction, and a second spring coupled to said sliding member for urging said sliding member in the direction opposite to said one direction.

15. The automatic cup drink vending machine in accordance with claim 10, which further comprises ice detecting means for detecting whether an ice quantity stored in said ice storing portion of said cold water making means is less than a predetermined quantity, and wherein said control means comprises gate switching control means responsive to the output of said ice detecting means (30) for shifting said switching gate means to said second ice dispensing means.

16. The automatic cup drink vending machine in accordance with claim 15, wherein said ice detecting means comprises displacement lever means for assuming a first position when a predetermined quantity of ice exists in said ice storing portion and for assuming a second position when the ice storing quantity is less than a predetermined quantity, and switching means responsive to the displacement of said displacement lever means for effecting an on/off control.

17. The automatic cup drink vending machine in accordance with claim 16, further comprising means for dispensing of ice to said ice storing portion of said cold water making means by said second ice dispensing means in an intermittent manner so that said detecting lever may correctly detect whether said stored quantity of ice is less than a predetermined quantity.

18. The automatic cup drink vending machine in accordance with claim 15, wherein said ice detecting means comprises a photosensitive device positioned at a predetermined height of said ice storing portion.

19. The automatic cup drink vending machine in accordance with claim 18, wherein said ice detecting means comprises a weight detecting means for detecting the weight of the ice stored in said ice storing portion to determine whether a predetermined quantity of ice is stored in said ice storing portion.

20. The automatic cup drink vending machine in accordance with claim 15, wherein said ice detecting means comprises electrical resistance detecting means responsive to a variation of the electrical resistance of the ice stored in said ice storing portion determining whether said predetermined quantity of ice is stored in said ice storing portion.

21. The automatic cup drink vending machine in accordance with claim 1, wherein said cold water making means comprises ice detecting means (30) for detecting whether the ice quantity stored in said ice stocking portion is less than a predetermined quantity, and wherein said control means comprises means responsive to said ice detecting means for enabling said second ice dispensing means.

22. The automatic cup drink vending machine in accordance with claim 21, wherein said control means is adapted to monitor the output of said ice detecting means at every predetermined time interval for enabling said second ice dispensing means when the output is obtained from said ice detecting means for supplying said ice from said ice making means to said ice storing portion of said cold water making means until the output of said ice detecting means disappears or until a predetermined time period ends, and for enabling and keeping enabled said first ice dispensing means after completion of an ice supply.

23. The automatic cup drink vending machine in accordance with claim 1, wherein said control means comprises full state detecting means provided (5) associated with said ice making means for detecting whether is full said ice making means, and means responsive to the output of said full state detecting means (5) for deenergizing said ice making means.

24. The automatic cup drink vending machine in accordance with claim 1, wherein said control means comprises ice making data generating means associated with said ice making means for generating data representing the quantity of ice made by said ice making means,
    accumulating means for accumulating said data, and
    ice dispensing control means responsive to the output of said accumulating means for controlling said second ice dispensing means for dispensing ice to said ice storing portion of said cold water making means when the quantity of ice made by said ice making means reaches a predetermined quantity at the beginning of operation of said apparatus.

25. The automatic cup drink vending machine in accordance with claim 24, wherein said control means comprises ice dispensing data generating means associated with said first and second ice dispensing means for generating data representing the quantity of ice dispensed from said ice making means, and which further comprises subtracting means for subtracting the data representing with the dispensed quantity of ice from the data accumulated in said accumulating means.

26. The automatic cup drink vending machine in accordance with claim 25, wherein said control means control said dispensing means so that at the beginning of operation a predetermined quantity of ice is dispensed to said ice storing portion of said cold water making means based on the data of said accumulating means, whereupon a cold drink is made vendible when a predetermined quantity of ice is made by said ice making means.

27. The automatic cup drink vending machine in accordance with claim 24, wherein the data representing the quantity of ice made by said ice making means is obtained as a product of an operating time period of said ice making means and an ice making quantity per unit time.

28. The automatic cup drink vending machine in accordance with claim 27, wherein the data representing the quantity of ice dispensed by said first and second ice dispensing means is obtained as a product of the dispensing time period by said first and second ice dispensing means and a dispensing quantity per unit time.

29. The automatic cup drink vending machine in accordance with claim 24, wherein said ice making control means comprises a full state data setting means for setting the data corresponding to the full state quantity of said ice making means, and
    presetting means responsive to the output of said full state detecting means for presetting said full state quantity data into said accumulating means.

* * * * *

UNITED STATES PATENT OFFICE
CERTIFICATE OF CORRECTION

Patent No. 4,319,698            Dated March 16, 1982

Inventor(s) Muneo Tomiyama et al

It is certified that error appears in the above-identified patent and that said Letters Patent are hereby corrected as shown below:

Claim 19, line 2, (column 20), "claim 18" should be --claim 15--.

Claim 23, line 3, (column 20), "provided (5)" should be --(5)--;
line 4, (column 20), "is full said ice making means," should read: --said ice making means is full--.

Signed and Sealed this

Sixth Day of July 1982

[SEAL]

Attest:

Attesting Officer

GERALD J. MOSSINGHOFF

Commissioner of Patents and Trademarks